United States Patent
Park et al.

(10) Patent No.: US 9,246,660 B2
(45) Date of Patent: Jan. 26, 2016

(54) METHOD AND APPARATUS FOR INTERFERENCE MITIGATION IN WIRELESS COMMUNICATION SYSTEM INCLUDING HETEROGENEOUS NETWORK

(75) Inventors: Sung Ho Park, Anyang-si (KR); Jin Young Chun, Anyang-si (KR); Ki Tae Kim, Anyang-si (KR); Su Nam Kim, Anyang-si (KR); Ji Won Kang, Anyang-si (KR); Bin Chul Ihm, Anyang-si (KR)

(73) Assignee: LG Electronics Inc., Seoul (KR)

( * ) Notice: Subject to any disclaimer, the term of this patent is extended or adjusted under 35 U.S.C. 154(b) by 94 days.

(21) Appl. No.: 14/130,618

(22) PCT Filed: Jul. 4, 2012

(86) PCT No.: PCT/KR2012/005303
§ 371 (c)(1),
(2), (4) Date: Jan. 2, 2014

(87) PCT Pub. No.: WO2013/005984
PCT Pub. Date: Jan. 10, 2013

(65) Prior Publication Data
US 2014/0140235 A1    May 22, 2014

Related U.S. Application Data

(60) Provisional application No. 61/504,297, filed on Jul. 4, 2011.

(51) Int. Cl.
*H04L 5/00* (2006.01)
*H04W 52/24* (2009.01)
*H04B 17/327* (2015.01)

(52) U.S. Cl.
CPC ........... *H04L 5/0073* (2013.01); *H04W 52/244* (2013.01); *H04B 17/327* (2015.01)

(58) Field of Classification Search
None
See application file for complete search history.

(56) References Cited

U.S. PATENT DOCUMENTS

| | | | |
|---|---|---|---|
| 2009/0286562 A1 | 11/2009 | Gorokhov | |
| 2009/0296635 A1* | 12/2009 | Hui et al. | 370/328 |
| 2011/0090885 A1* | 4/2011 | Safavi | 370/338 |
| 2011/0235598 A1* | 9/2011 | Hilborn | 370/329 |
| 2013/0029657 A1* | 1/2013 | Gao et al. | 455/422.1 |
| 2013/0089040 A1* | 4/2013 | Tabet et al. | 370/329 |
| 2013/0155991 A1* | 6/2013 | Kazmi et al. | 370/329 |
| 2014/0113677 A1* | 4/2014 | Parkvall et al. | 455/522 |

FOREIGN PATENT DOCUMENTS

| | | |
|---|---|---|
| WO | 2010006285 A2 | 1/2010 |
| WO | 2011005537 A2 | 1/2011 |

* cited by examiner

*Primary Examiner* — Kerri Rose
(74) *Attorney, Agent, or Firm* — Dentons US LLP

(57) ABSTRACT

Provided are a method and apparatus for mitigating the interference of an interfering base station (eNB) in a heterogeneous network. The method comprises: transmitting threshold value information to an interfered eNB; receiving second feedback information, which takes into account interference caused by the interfering eNB to an interfered user equipment (UE) selected by the interfered eNB, from the interfered UE on the basis of the threshold value information and first feedback information; selecting a precoding matrix for minimizing interference to the interfered UE on the basis of the second feedback information; and applying the precoding matrix and transmitting a signal to an UE, to which the interfering eNB provides service.

8 Claims, 7 Drawing Sheets

METHOD AND APPARATUS FOR INTERFERENCE MITIGATION IN WIRELESS COMMUNICATION SYSTEM INCLUDING HETEROGENEOUS NETWORK

This application is a 35 USC §371 National Stage entry of International Application No. PCT/KR2012/005303, filed on Jul. 4, 2012, and claims priority of U.S. Provisional Application Nos. 61/504,297 filed on Jul. 4, 2011, which is hereby incorporated by reference in its entirety.

BACKGROUND OF THE INVENTION

1. Field of the Invention

The present invention concerns wireless communications, and more specifically, to a method and apparatus for mitigating interference in a wireless communication system including a heterogeneous network.

2. Related Art

Recently, data transmission over a wireless communication network is sharply increasing. A reason can be attributed to the fact that smart phones, tablet PCs, and other new high data-usage devices are coming up and spreading. In order to satisfy high data transmission as required, such technologies as carrier aggregation (CA) and cognitive ratio (CR) for efficiently using more frequency bands and multi-antenna and multi-base station cooperative transmission for raising data capacity in a limited frequency band are attracting attention.

Further, wireless communication networks are evolving to have more accessible nodes. Here, the "nodes" may mean antennas or antenna groups spaced apart from each other by a predetermined distance or more in a distributed antenna system (DAS), but are not limited to such concept. Rather, the term "node" may have a broader meaning. That is, a node may be a macro base station, a pico cell base station (PeNB), a home base station (HeNB), an RRH (Remote Radio Head), an RRU (Remote Radio Unit), a relay, or a distributed antenna (group). As the node density increases, the wireless communication system having the node density may show higher system performance owing to cooperation between nodes. That is, as compared with when each node operates without a cooperation from an independent base station, much better system performance may be obtained when each node is managed by a single control station for transmission/reception so that it is rendered to operate as an antenna or antenna group for one cell.

If each node may perform scheduling and hand over, with its individual cell ID (identifier), then this may be called a multi-cell system. If, a multi-cell is configured with overlapped coverage, this is referred to as a multi-tier network.

The multi-cell system/multi-tier network is sometimes collectively referred to as a heterogeneous network, as well. The heterogeneous network, in contrast to the homogeneous network configured of homogeneous cells, has multiple nodes operated, mixed in a cell or the same network, and this means that the nodes are operated as different types of base stations from each other, rather than as the same type of base station (or cell). For instance, a macro base station with broader coverage and a plurality of pico/femto base stations with narrower coverage in the coverage of the macro base station, and relays, may be used together.

A heterogeneous network has different characteristics of interference from those of the homogeneous network, and a need exists for a method for mitigating such interference.

SUMMARY OF THE INVENTION

An object of the present invention is to provide a method and apparatus for mitigating interference in a wireless communication system including a heterogeneous network.

In an aspect, there is provided a method of mitigating interference from an interfering base station in a heterogeneous network. The method comprises transmitting information on a threshold to an interfered base station, receiving, based on the information on the threshold and first feedback information, second feedback information considering interference that the interfering base station imposes to an interfered terminal selected by the interfered base station from the interfered terminal, selecting a precoding matrix that minimizes interference to the interfered terminal based on the second feedback information, and transmitting a signal to a terminal to which the interfering base station offers a service by applying the precoding matrix, wherein the first feedback information is information obtained by the interfered terminal measuring a reference signal of the interfering base station and a reference signal of the interfered base station to compare reception power, and wherein the interfered terminal selected by the interfered base station is a terminal in which the first feedback information satisfies a comparison condition with the threshold, among terminals to which the interfered base station offer a service.

The reference signal of the interfering base station and the reference signal of the interfered base station may be transmitted through radio resources differentiated from each other.

The second feedback information may include a precoding matrix index selected by the interfered terminal and the amount of interference that the interfering base station imposes to the interfered terminal.

The precoding matrix index selected by the interfered terminal may be selected based on a channel matrix between the interfered terminal and the interfered base station and interference between the interfered terminal and the interfering base station.

The interfering base station may have a larger transmission power than a transmission power of the interfered base station.

A first coverage in which the interfered base station provides a service may be positioned in a second coverage in which the interfering base station provides a service.

When the interfered base station provides a service to a plurality of terminals, the interfered base station may receive the first feedback information from the plurality of terminals, select a terminal satisfying a condition by comparing the first feedback information and the threshold, and trigger the selected terminal to feed back the second feedback information to the interfering base station.

In another aspect, an apparatus of mitigating interference from an interfering base station, the apparatus comprises an RF (radio frequency) unit transmitting and receiving a radio signal, and a processor connected with the RF unit, wherein the processor transmits information on a threshold to an interfered base station, receives, based on the information on the threshold and first feedback information, second feedback information considering interference that the interfering base station imposes to an interfered terminal selected by the interfered base station from the interfered terminal, selects a precoding matrix that minimizes interference to the interfered terminal based on the second feedback information, and transmits a signal to a terminal to which the interfering base station offers a service by applying the precoding matrix, wherein the first feedback information is information obtained by the interfered terminal measuring a reference signal of the interfering base station and a reference signal of the interfered base station to compare reception power, and wherein the interfered terminal selected by the interfered base station is a terminal in which the first feedback information satisfies a comparison condition with the threshold, among terminals to which the interfered base station offer a service.

When an SLNR (Signal to Leakage plus Noise Ratio)-based interference mitigation scheme applies in a wireless communication system including a heterogeneous network, interference can be efficiently mitigate using limited feedback information.

DESCRIPTION OF EXEMPLARY EMBODIMENTS

The terminal (User Equipment, UE) may be stationary or mobile and may be referred to by other terms, such as an MS (Mobile Station), an MT (Mobile Terminal), a UT (User Terminal), an SS (Subscriber Station), a wireless device, a PDA (Personal Digital Assistant), a wireless modem, or a handheld device.

The base station is generally a fixed station that communicates with a terminal and may be referred to by other terms such as an eNB (evolved-NodeB), a BTS (Base Transceiver System), an access point, or a node.

There are various types of base stations. For example, the macro base station means a base station that has broad coverage and high transmission power. The pico/femto base station means a base station that has lower transmission power and narrower coverage than those of the macro base station. The pico/femto base station is also called an LPN (Low Power Node).

Among others, terminals receiving a service from a macro base station are referred to as macro terminals (macro UE: MUE), and terminals, which are LPNs receiving a service from a pico base station, are referred to as pico terminals (pico UE:PUE).

Figure 1:
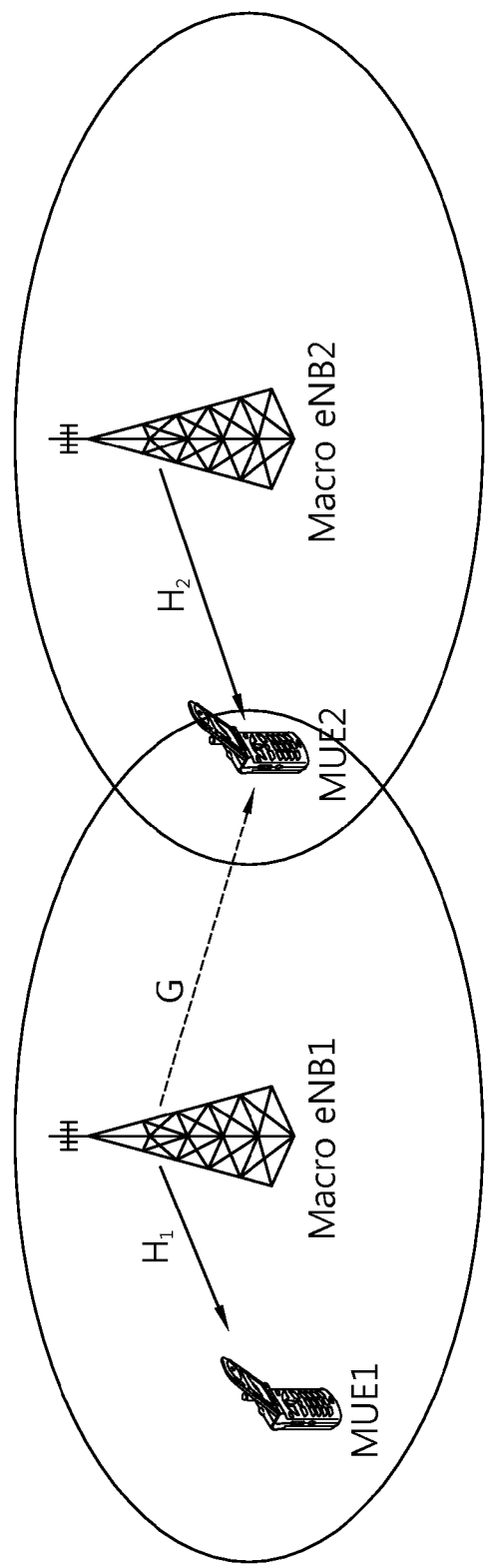
FIG. 1 shows an example of interference to a macro terminal in a conventional homogeneous network consisting of only macro base stations.

FIG. 1 shows an example of interference to a macro terminal in a conventional homogeneous network consisting of only macro base stations.

Referring to FIG. 1, macro base station 1 and macro base station 2 may have the same coverage and the same bandwidth. The channel between macro base station 1 and macro terminal 1 (MUE1) is denoted as H1, and the channel between macro base station 2 and macro terminal 2 (MUE2) is denoted as H2. The inter-cell interference of macro base station 1 to macro terminal 2 is denoted as G. In case macro terminal 2 is positioned at a cell boundary, the inter-cell interference G to macro terminal 2 (MUE2) may have a similar strength to that of a signal received from macro base station 2 receiving a service.

Figure 2:
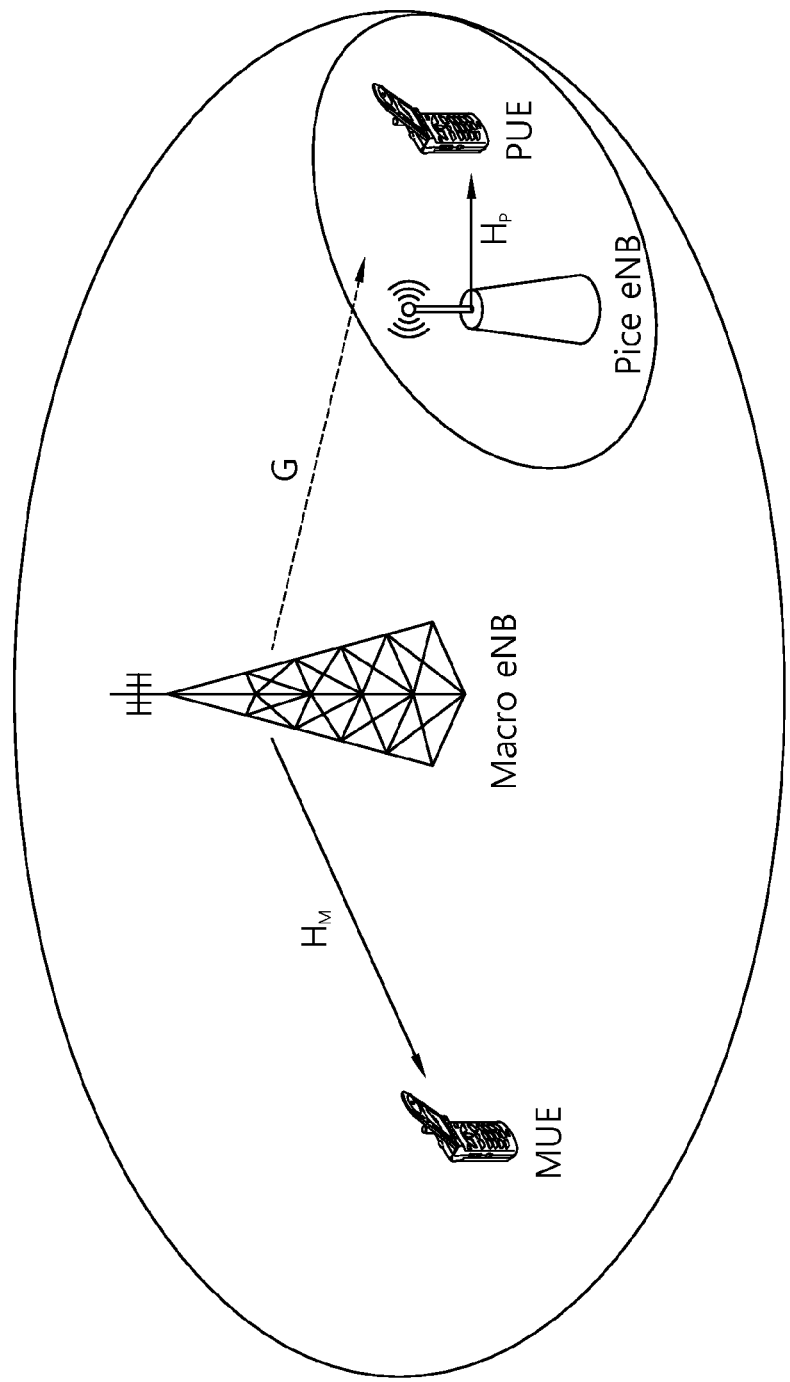
FIG. 2 shows an example of interference to a pico terminal in a heterogeneous network.

FIG. 2 shows an example of interference to a pico terminal in a heterogeneous network.

Referring to FIG. 2, the pico base station is positioned in the coverage of a macro base station. In a pico terminal (PUE) communicating with the pico base station, the channel between the pico base station and the pico terminal is denoted as $H_p$, and the channel between the macro base station and the macro terminal is denoted as $H_M$. The pico terminal receives inter-cell interference G from the macro base station. Although not shown in the drawings, the pico terminal may also receive inter-cell interference from other neighboring macro base stations.

The inter-cell interference received by the pico terminal in the heterogeneous network may have different characteristics from the inter-cell interference received by the macro terminal in a homogeneous network. This is why in the homogeneous network different cells from each other show similar inter-cell transmission power, while in the heterogeneous network, different cells from each other may have a large difference in the plurality of (by way of example, the macro base station may have a transmission power of 46 to 49 dBm, and the pico base station may have a transmission power of 24 to 30 dBm). Accordingly, in case the pico terminal is positioned at a coverage boundary of the pico base station, the pico terminal may receive inter-cell interference that has a larger influence as compared with the macro terminal because the transmission power of the macro base station is much higher than that of the pico base station.

As such, as methods for mitigating inter-cell interference that occurs in a heterogeneous network, there are eICIC (extended inter-cell interference cancellation) in the time domain, such as fractional frequency reuse (FFR), ABS (almost blank sub-frame), and use of MBSFN (multicast broadcast single frequency network) sub-frame. On top of that, an interference mitigation scheme is present that is based on an SLNR (signal to leakage plus noise ratio), which calculates a relative signal strength considering same channel interference that is utilized in MU-MIMO (multi user multi input multi output).

Hereinafter, the conventional SLNR-based interference mitigation scheme is described with reference to FIGS. 3 to 5.

Figure 3:
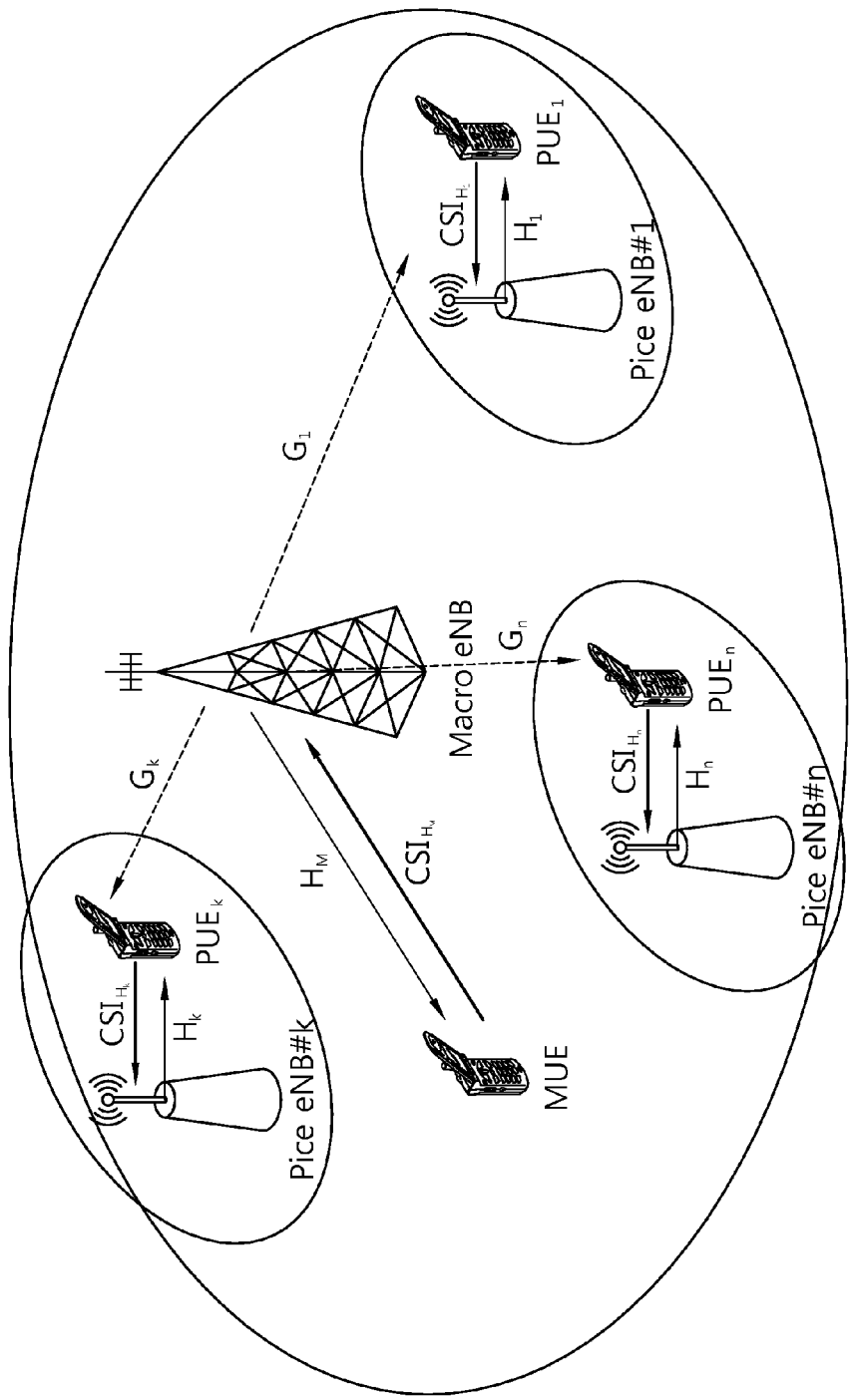
FIG. 3 shows an example heterogeneous network where N pico base stations are present in the coverage of a macro base station.

FIG. 3 shows an example heterogeneous network where N pico base stations are present in the coverage of a macro base station.

Referring to FIG. 3, for ease of description, it is assumed that there is one pico terminal per pico base station. Assuming CL MIMO (closed loop MIMO), the macro terminal (MUE) produces channel state information (CSI) by measuring a channel ($H_M$) with the macro base station and feeds the channel state information (denoted as $CSI_{HM}$) back to the macro base station.

Pico terminal n (where n is any one of 1 to N) measures a channel (Hn) with pico base station #n and feeds channel state information ($CSI_{Hn}$) to base station #n.

However, as described above, what matters in the inter-cell interference to the pico terminal is the interference coming from the macro base station. In consideration of this, the CSI fed back by the pico terminal may be varied as shown in FIG. 4.

Figure 4:
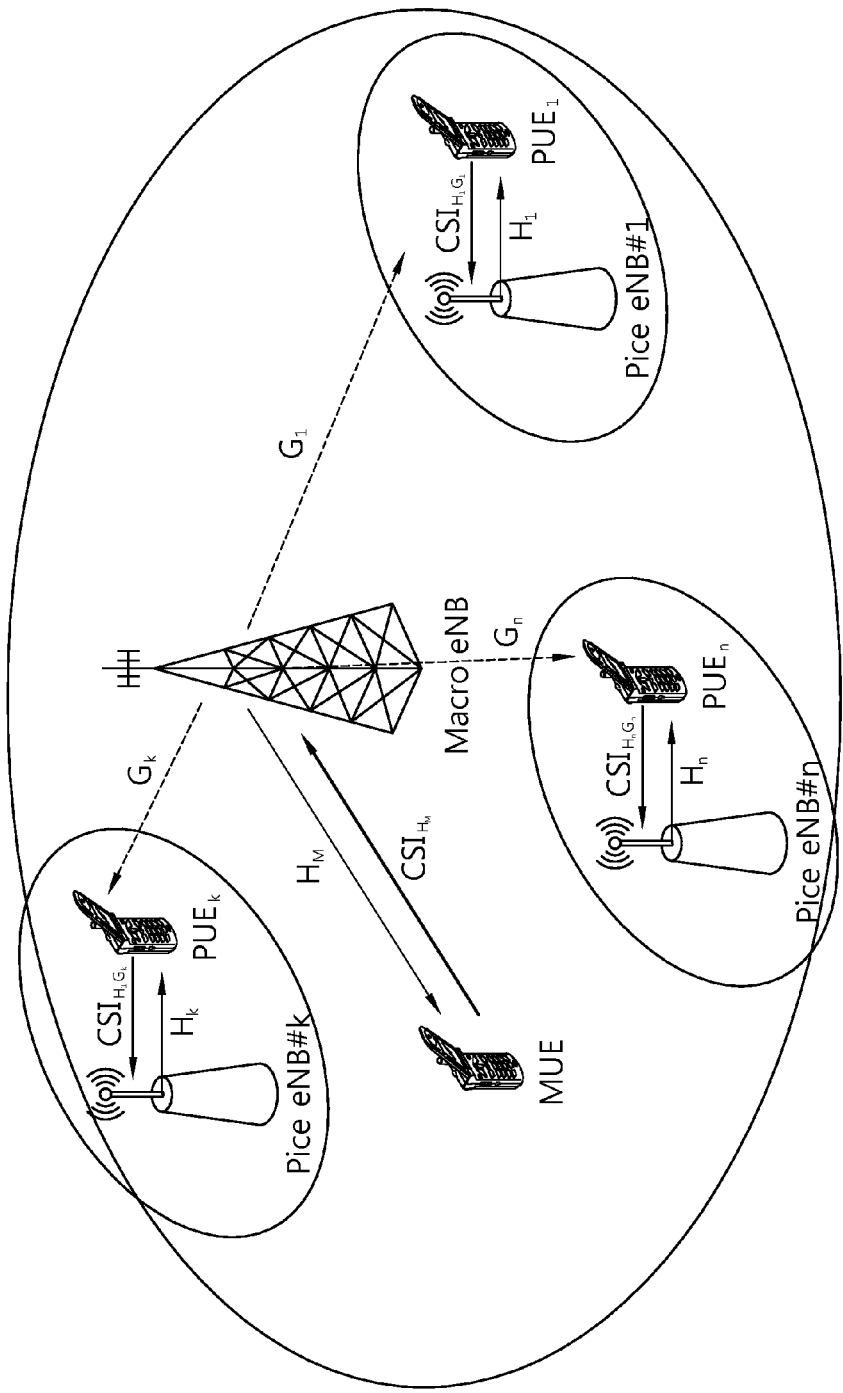
FIG. 4 shows example CSI fed back from a pico terminal in a heterogeneous network so as to apply an SLNR-based interference mitigation scheme.

FIG. 4 shows example CSI fed back from a pico terminal in a heterogeneous network so as to apply an SLNR-based interference mitigation scheme.

Referring to FIG. 4, the pico terminal feeds back to the pico base station channel state information (denoted as $CSI_{Hn,Gn}$)

considering interference coming from the macro base station in addition to or instead of the channel state information ($CSI_{Hn}$) of FIG. 3. Then, the pico base station delivers the channel state information ($CSI_{Hn,Gn}$) to the macro base station, and the macro base station updates scheduling information for the macro terminal to mitigate interference to the pico terminal based on such channel state information ($CSI_{Hn,Gn}$). The updated scheduling information may include, e.g., a precoding matrix applied to the macro terminal or information indicating the precoding matrix (precoding matrix index: PMI).

Such scheme is referred to as SLNR-based interference mitigation scheme.

The following equation, Equation 1, represents an SLNR for estimating a relative signal strength considering interference from the terminal to be scheduled along, in the MU-MIMO.

$$SLNR_i = \frac{\|H_i W_i\|^2}{\sum_{k=1, k \neq i}^{N} \|H_k W_i\|^2 + \sigma I} \quad \text{[Equation 1]}$$

In Equation 1, Hi is a channel matrix for terminal i, and Wi is a precoding matrix for terminal i. Hk represents a channel matrix for another terminal k that has been scheduled alongside terminal i. σI is a noise.

By using an SLNR for terminal i as in Equation 1 above, a precoding matrix for terminal I may be configured considering interference to other N−1 terminals, scheduled to the same resource. That is, instead of selecting a precoding matrix that guarantees the maximum capacity for terminal i, a precoding matrix is selected so as to increase capacity while lowering interference to other terminals. Then, although the capacity for terminal i is slightly lessened, the overall performance of the system may be enhanced.

Such SLNR may be utilized to mitigate inter-cell interference in a heterogeneous network. The MU MIMO in the single cell environment may be performed in a similar type to the SU-MIMO or MU-MIMO in a multi-cell environment. That is, the pico terminal may be treated as another terminal that is scheduled with terminal i in Equation 1 above, so that the SLNR may apply.

However, such SLNR-based interference mitigation scheme requires explicit channel information for a terminal (terminal i) servicing in the base station that applies the SLNR as shown in Equation 1 above and other terminals. Accordingly, this scheme has the disadvantage that the feedback overhead of the terminals is sharply increased.

To address such disadvantage, a method feeds back implicit channel information estimating a corresponding channel matrix, instead of the explicit channel information in each terminal. The implicit channel information may be, e.g., a PMI indicating a precoding matrix that is to replace a channel matrix.

The following equation, Equation 2, is an example of when applying the existing SLNR, with the SLNR changed to be PMI based in the heterogeneous network.

$$SLNR \text{ for } MUE = \quad \text{[Equation 2]}$$

-continued
$$\frac{W_M^H H_M^H H_M W_M}{\sum_{n=1}^{N} W_M^H H_n^H H_n W_M + \sigma I} \approx \frac{W_M^H (C_M C_M^H) W_M}{\sum_{n=1}^{N} W_M^H (v_n v_n^H) W_M + \sigma I}$$

In Equation 2, $C_M$ is a precoding matrix/vector rendered to be known to the base station by the precoder information (PMI) fed back by the macro terminal, and $v_n$ is a precoding matrix/vector rendered to be known to the base station by the precoder information (PMI) fed back by the nth pico terminal scheduled together with the macro terminal, and the value is yielded considering interference received by the pico terminal from the macro base station. That is, instead of the existing channel matrix, a precoding matrix/vector identified by the PMI that is fed back by the terminal is used. $X^H$ refers to the hermitian of X.

Figure 5:
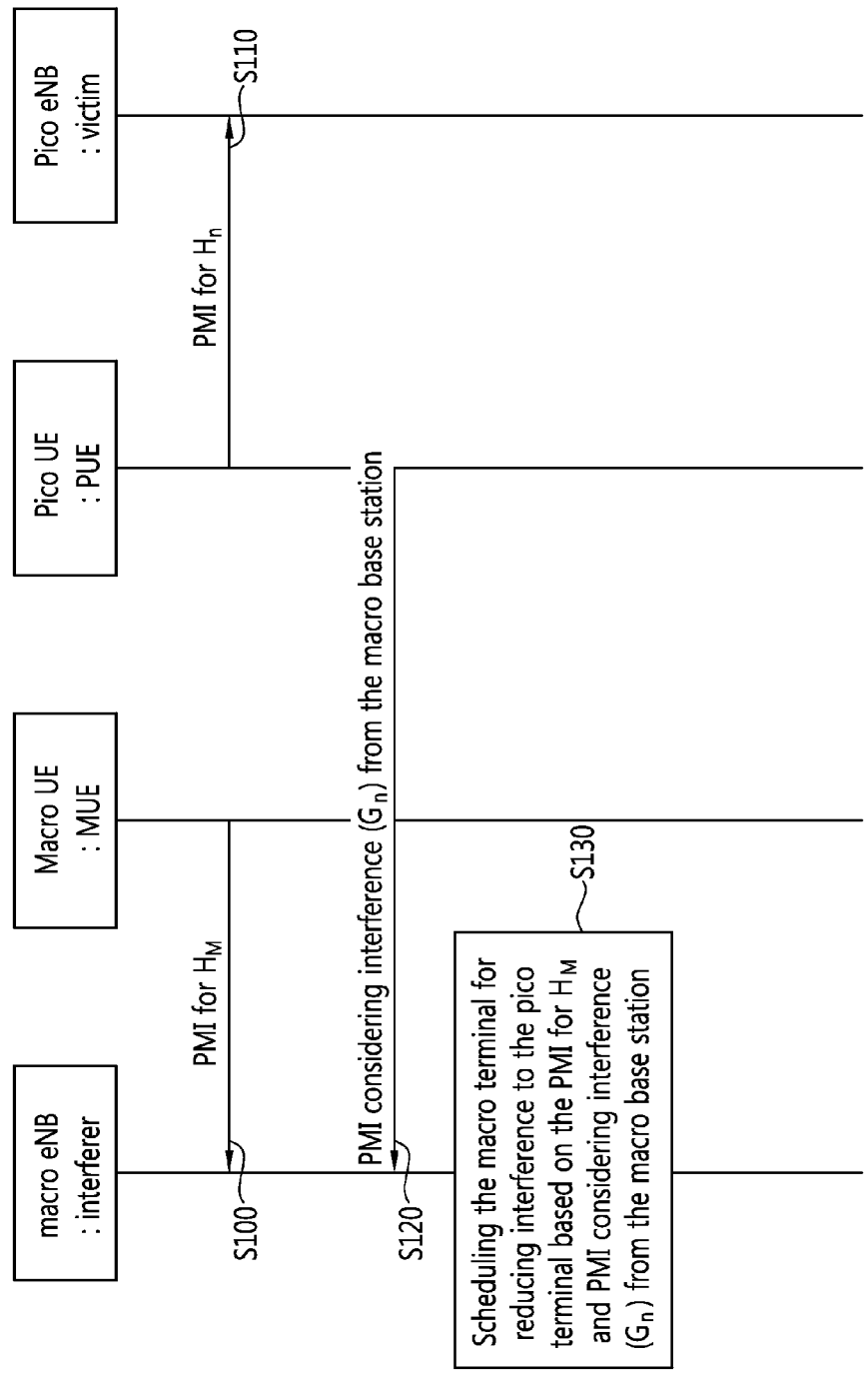
FIG. 5 shows an example signaling process in a heterogeneous network for applying a conventional SLNR-based interference mitigation scheme.

FIG. 5 shows an example signaling process in a heterogeneous network for applying a conventional SLNR-based interference mitigation scheme.

Assume that the macro base station is an interfering base station that gives strong interference to the pico terminal, and that it is the pico terminal that receives interference.

Referring to FIG. 5, the macro terminal feeds back to the macro base station channel state information for the channel ($H_M$) with the macro base station (for example, a channel matrix itself, a covariance matrix, an eigen matrix, a PMI, CQI (channel quality information), or an RI (rank indicator), which is denoted as $CSI_{HM}$) (S100).

$CSI_{HM}$ may include a PMI satisfying the following equation:

$$C_M = \underset{C_M \in CB}{\mathrm{argmax}} \{\|H_M w_M\|^2\}, \quad \text{[Equation 3]}$$

In Equation 3, CB refers to a set of precoding matrixes that are known between the macro base station and the macro terminal. Equation 3 means extracting, with $C_M$, a precoding matrix that enables the square of an absolute value of $H_M w_M$ to be largest.

The pico terminal feeds back channel state information (denotes as $CSI_{Hn}$) for a channel (Hn) with the pico terminal (S110). For example, $CSI_{Hn}$ may include a PMI satisfying the following equation:

$$W_n = \underset{w_n \in CB}{\mathrm{argmax}} \{\|H_n W_n\|^2\}, \quad \text{[Equation 4]}$$

In Equation 4, CB denotes a set of precoding matrixes that are known between the pico base station and the pico terminal.

Further, the pico terminal yields additional channel state information (denoted as $CSI_{Gn}$) considering interference (Gn) from the macro base station and feeds it back (S120). Although FIG. 5 illustrates an example where the pico terminal feeds back $CSI_{Gn}$ to the macro base station, the pico terminal may also feed it back to the pico base station.

$CSI_{Gn}$ may include Vn satisfying the following condition:

$$V_n = \underset{W_n, V_n \in CB}{\mathrm{argmax}} \{(H_n W_n)^H (G_n V_n)\} = \underset{W_n, V_n \in CB}{\mathrm{argmax}} \{W_n^H H_n^H G_n V_n\}, \quad \text{[Equation 5]}$$

The macro base station updates scheduling information on the macro terminal so as to mitigate interference to the pico terminal based on the $CSI_{Gn}$ fed back from the pico terminal and the $CSI_{HM}$ fed back from the macro terminal (S130). For example, the macro terminal may be scheduled to reduce interference to the pico terminal based on the PMI considering the interference Gn from the macro base station and the PMI for the $H_M$.

The above-described SLNR-based interference mitigation scheme in the heterogeneous network rearranges the precoding matrix applied to the macro terminal based on the channel information of the macro terminal and pico terminal so as to mitigate the interference to the pico terminal. By such method, the performance of the macro terminal may be slightly lowered. However, the overall system performance may be enhanced.

In particular, the SLNR-based interference mitigation scheme based on the PMI uses only limited channel information, so that an enhancement in performance, which is close to that obtained by the existing SLNR-based interference mitigation scheme, may be achieved with a small amount of feedback.

However, the SLNR-based interference mitigation scheme requires additional CSI estimation from an interfered terminal (in the above example, the pico terminal) receiving interference, and although the amount of feedback has been reduced, cannot be avoided from causing additional feedback. Further, the more interfered terminals, the more counts of calculation the base station (the macro base station in the above example) needs. Further, in case there are very many interfered terminals, the CSI characteristics of the interfered terminals are rendered to have a uniform distribution, so that the SLNR-based interference mitigation scheme may experience a performance deterioration.

An interference mitigation scheme in a heterogeneous network according to the present invention is now described.

The interference mitigation scheme in a heterogeneous network according to the present invention, unlike the conventional scheme, conducts SLNR-based interference mitigation by receiving a CSI feedback for an interfering base station from some of interfered terminals. That is, according to the present invention, a CSI feedback on the interfering base station is received only from some of the interfered terminals, to thereby perform interference mitigation.

In order to pick up interfered terminals, the interfered terminals feed back to the interfering base station directly or via an interfered base station information that lets known the relative strength or channel state of a signal received from the interfering base station and serving base station, such as reception power or reception SINR (signal to interference plus noise ratio) for a signal received from the serving base station (i.e., the interfered base station, e.g., the pico base station is the serving base station with respect to the pico terminal) and the interfering base station. Specifically, the following information may be fed back to the interfering base station.

1. Reference signal received power (RSRP). That is, reception power for a reference signal, received from the interfering base station and serving base station may be fed back.

2. Reference signal received quality (RSRQ). The reception quality of a reference signal may be quantized and may be fed back in the form of an index.

3. Ratio of an RSRP for the serving base station and interfering base station.

4. Ratio of an RSRQ for the serving base station and interfering base station.

5. CSI-RS-based RSRP and CSI-RS (channel state information-reference signal) means a terminal-specific reference signal that is transmitted for channel estimation. In case the interfering base station and serving base station use different CSI-RSs from each other, different base stations from each other may be differentiated, so that an RSRP for each base station may be fed back.

6. CSI-RS-based RSRQ.

7. Ratio of CSI-RS-based RSRP for the serving base station and interfering base station.

8. Ration of CSI-RS-based RSRQ for the serving base station and interfering base station.

9. Channel power ratio of the serving base station and interfering base station, estimated using a CSI-RS.

The interfering base station or interfered base station picks up an interfered terminal that transmits CSI to be referenced by the interfering base station, using at least one of the above-listed information items 1 to 9. At this time, as a reference to select an interfered terminal, a threshold may be used.

The threshold may be selected as any one or more of the following:

A. Predetermined value of reception power values of interfered terminals with respect to the interfered base station (channel power measured through RSRP, CSI-RS)

B. Predetermined value among reception quality values of interfered terminals (for example, reception SINR, RSRQ, or CQI).

C. Reception power corresponding to lower Y values of reception power values of the interfered terminals (channel power measured by RSRP, CSI-RS), where Y is a value that may vary depending on channel states.

D. Reception quality corresponding to lower Y values of reception quality values of the interfered terminals (reception SINR, RSRQ, or CQI).

E. Value arbitrarily determined by a base station.

F. Value pre-determined in the system.

The thresholds of the items A to F are merely examples, and the thresholds may be freely determined depending on what information the interfered terminal feeds back. The interfering base station determines a precoding matrix for interference mitigation using the CSI fed back from the interfered terminal satisfying a predetermined condition by comparing the above 1 to 9 information items fed back from the interfered terminal and the thresholds.

The thresholds may be informed by the interfering base station to the interfered base station. The interfered base station then compares the thresholds with the above 1 to 9 information items fed back from the interfered terminal to thereby determine whether the condition is met. Thereafter, only the interfered terminal satisfying the conditions is instructed to feed back the CSI considering the interference of the interfering base station.

Or, in case the interfering base station applies an SLNR-based interference mitigation scheme, the interfering base station or interfered base station informs it to the interfered terminals so that CSI feedback for the interfering base station is triggered. The interfered terminals feed back the CSI for the interfering base station to the interfered base station, and among such fed back information, may feed back only the feedback information satisfying the condition based on the above-described thresholds to the interfering base station.

A specific application of the above-described method is hereinafter described.

Figure 6:
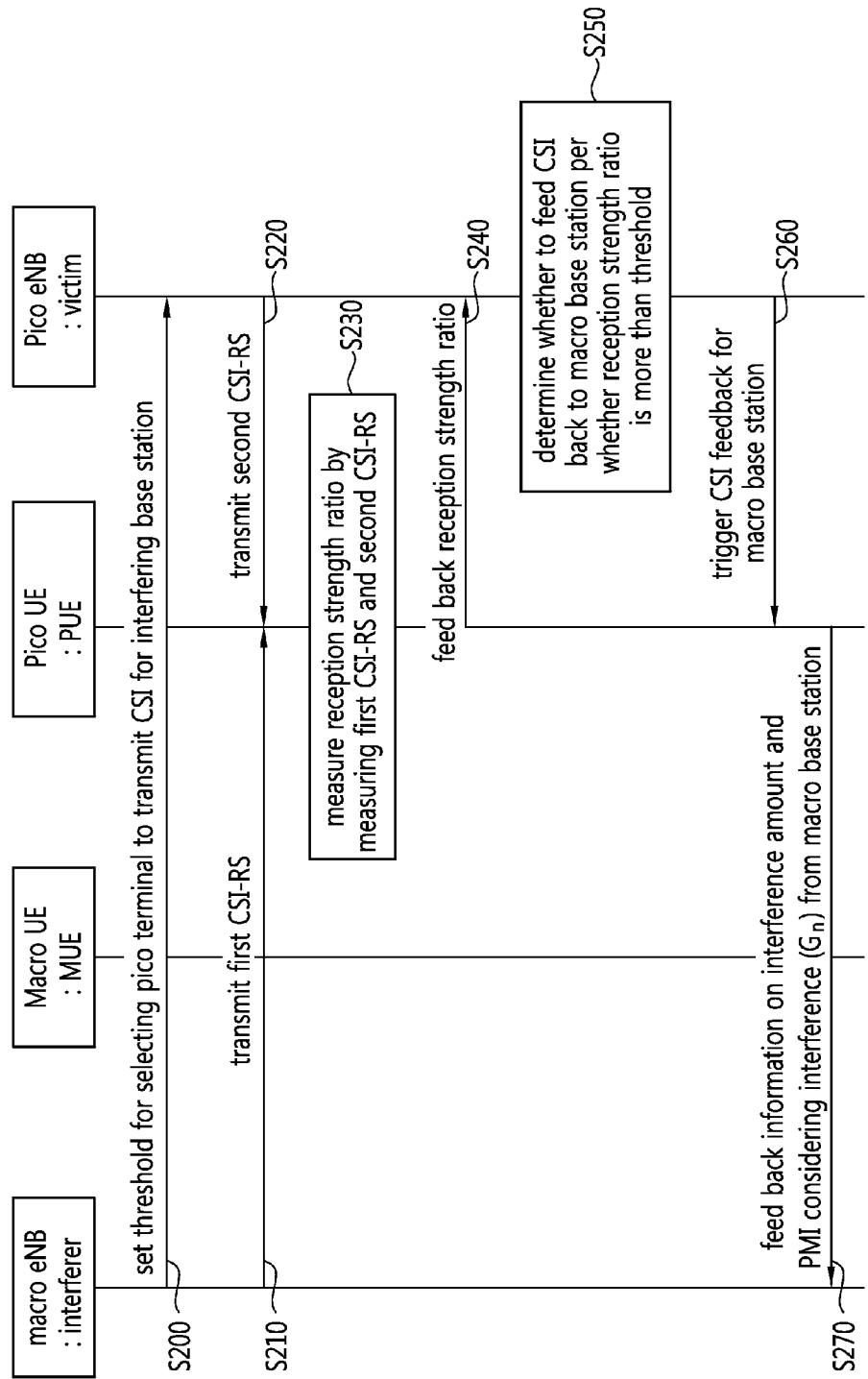
FIG. 6 shows an interference mitigation scheme in a heterogeneous network according to an embodiment of the present invention.

FIG. 6 shows an interference mitigation scheme in a heterogeneous network according to an embodiment of the present invention. In FIG. 6, it is assumed that the macro base station is an interfering base station, and the pico terminal is an interfered terminal that receives interference from the macro base station. Of course, this is merely an example, and the present invention is not limited thereto.

Referring to FIG. 6, the macro base station sets a threshold for selecting a pico terminal that is to transmit CSI for the interfering base station to a pico base station (S200).

The macro base station transmits a first CSI-RS to the pico terminal (S210), and the pico base station also transmits a second CSI-RS to the pico terminal (S220).

The pico terminal measures a reception strength ratio by measuring the first CSI-RS and second CSI-RS (S230)0. The reception strength ratio may be in the form of information item 3, 4, 7, 8, or 9 among the above information items 1 to 9.

The pico terminal feeds back the reception strength ratio to the pico base station (S240).

The pico base station determines whether to feed back CSI for the macro base station based on whether the reception strength ratio is larger than a threshold (S250). If the reception strength ratio fed back from the pico terminal is not more/less than the threshold and satisfies a predetermined condition, CSI feedback for the macro base station is triggered (S260).

The pico terminal feeds back information on the interference amount and a PMI considering interference from the macro base station to the macro base station (S270).

That is, among pico terminals interfered by the macro base station, some pico terminals are selected based on a predetermined reference, and the interfering base station is fed back with the CSI for the interfering base station only from the selected pico terminals, thereby determining a precoding matrix for the macro terminal. Accordingly, as compared with the conventional method, the number of pico terminals that should feed back CSI is reduced.

Further, the interfered terminal (pico terminal) additionally feeds back information on interference amount, as well as the PMI information, so that the existing SLNR-based interference mitigation scheme may have its performance enhanced or compensated.

A look at the approximation of Equation 2 above shows that a PMI, which is implicit channel information, is used because the explicit channel information has a large information amount. This considers only the phase for an interference channel between the interfering base station and interfered terminal. Resultantly, information on an actual interference channel is insufficient, and this comes as a quantization error in the SLNR. To address this, information on the interference amount for the interference channel is also fed back by the interfered terminal.

Equation 2 may be represented as the following equation, Equation 6, when it comes to the SLNR concept for the macro terminal.

$$SLNR \text{ for } MUE = \frac{W_M^H H_M^H H_M W_M}{\sum_{n=1}^{N} W_M^H H_n^H H_n W_M + \sigma I} \approx \frac{W_M^H (C_M C_M^H) W_M}{\sum_{n=1}^{N} P_{I,n} W_M^H (V_n V_n^H) W_M + \sigma I} \quad [\text{Equation 6}]$$

In Equation 6, $P_{I,n}$ denotes the amount of interference that an interfering base station imposes to interfered terminal n.

$P_{I,n}$ may be induced as following equation 7 using equation 5:

$$P_{I,n} = \frac{|H_n^H G_n|}{|V_n V_n^H|}, \quad [\text{Equation 7}]$$

That is, the interfered terminal may enhance/compensate for the performance of the existing SLNR-based interference mitigation scheme using PMI only, by feeding back information on the interference amount as shown in Equation 7, as well as the PMI (Vn) as shown in Equation 5.

Figure 7:
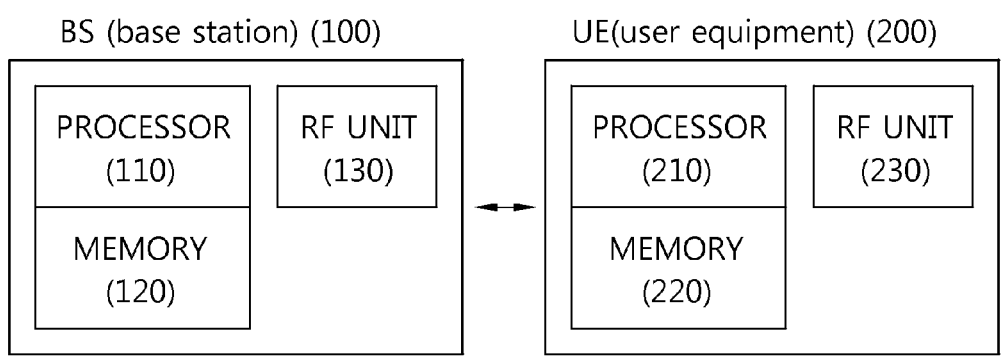
FIG. 7 is a block diagram illustrating a wireless device where an embodiment of the present invention is implemented.

FIG. 7 is a block diagram illustrating a wireless device where an embodiment of the present invention is implemented.

The base station 100 includes a processor 110, a memory 120, and an RF (Radio Frequency) unit 130. The base station 100 may be an interfering base station. The processor 110 implements a function, process, and/or method as suggested herein. For example, the processor 110 transmits information on a threshold to an interfered base station, and based on the threshold information and first feedback information, receives second feedback information considering interference which the interfering base station imposes to the interfered terminal from the interfered terminal selected by the interfered base station. Here, the first feedback information may be any one of the above-described items 1 to 9. As an example, the first feedback information may be information obtained by the interfered terminal measuring the reference signals of the interfering base station and interfered base station and making comparisons in reception power. The threshold information may be any one of the above-described items A to F. Further, the processor 110 selects a precoding matrix that minimizes interference to the interfered terminal based on the second feedback information, applies the precoding matrix, and transmits a signal to the terminal to which the interfering base station provides a service. The interfered terminal selected by the interfered base station may be a terminal in which the first feedback information satisfies a comparison condition with the threshold, among the terminals to which the interfered base station is servicing. The memory 120 is connected with the processor 110 and stores various pieces of information for driving the processor 110. The RF unit 130 is connected with the processor 110 and transmits and/or receives radio signals.

The terminal 200 includes a processor 210, a memory 220, and an RF unit 230. The terminal 200 may be an interfered terminal. The processor 210 implements a function, process, and/or method as suggested herein. For example, the processor 210 measures reference signals transmitted from an interfering base station and an interfered base station to generate first feedback information and then transmits the first feedback information to the interfered base station. If a triggering signal is received from the interfered base station, second feedback information considering interference from the interfering base station is transmitted to the interfering base station. The second feedback information may include information on an interference amount as shown in Equation 7, as well as a PMI. The memory 220 is connected with the processor 210 and stores various pieces of information for driving the processor 210. The RF unit 230 is connected with the processor 210 and transmits and/or receives radio signals.

The processor 110 or 210 may include an ASIC (application-specific integrated circuit), other chipsets, a logic circuit, a data processing device, and/or a converter that performs conversion between a baseband signal and a wireless signal. The memory 120 or 220 may include a ROM (read-only memory), a RAM (random access memory), a flash memory, a memory card, a storage medium, and/or other storage devices. The RF unit 130 or 230 may include one or more antennas that transmit and/or receive radio signals. When an embodiment is implemented in software, the above-described schemes may be realized in modules (processes, or functions) that perform the above-described functions. The modules may be stored in the memory 120 or memory 220 and may be executed by the processor 110 or 120. The memory 120 may be positioned in or outside the processor 110 or 210 and may be connected to the processor 110 or processor 210 via various well-known means.

Although embodiments of the present invention have been described, it will be understood by those of ordinary skill in the art that various changes in detail and form may be made thereto without departing from the scope of the present invention as defined in the following claims.

What is claimed is:

1. A method of mitigating interference in a heterogeneous network, the method performed by an interfering base station and comprising:

transmitting threshold information to an interfered base station;

receiving second feedback information from a first user equipment (UE) selected by the interfered base station, wherein the second feedback information is based on the threshold information and first feedback information, and wherein the second feedback information reflects interference that the interfering base station imposes on the first UE;

selecting a precoding matrix that minimizes interference to the first UE based on the second feedback information; and transmitting a signal to a second UE to which the interfering base station offers a service by applying the precoding matrix, wherein the first feedback information is obtained by the first UE by measuring a reference signal of the interfering base station and a reference signal of the interfered base station to compare reception power, and wherein the first UE is selected because the first feedback information satisfies a comparison condition with the threshold, among a plurality of UEs to which the interfered base station offers a service.

2. The method of claim 1, wherein the reference signal of the interfering base station and the reference signal of the interfered base station are transmitted through radio resources differentiated from each other.

3. The method of claim 1, wherein the second feedback information includes a precoding matrix index selected by the interfered UE and the amount of interference that the interfering base station imposes to the interfered UE.

4. The method of claim 3, wherein the precoding matrix index selected by the interfered UE is selected based on a channel matrix between the interfered UE and the interfered base station and interference between the interfered UE and the interfering base station.

5. The method of claim 1, wherein the interfering base station has a larger transmission power than a transmission power of the interfered base station.

6. The method of claim 1, wherein a first coverage in which the interfered base station provides a service is positioned in a second coverage in which the interfering base station provides a service.

7. The method of claim 1, wherein when the interfered base station provides a service to a plurality of UEs, the interfered base station receives the first feedback information from the plurality of UEs, selects UE satisfying a condition by comparing the first feedback information and the threshold, and triggers the selected UE to feed back the second feedback information to the interfering base station.

8. An apparatus for mitigating interference, by an interfering base station, the apparatus comprising:

an RF (radio frequency) unit transmitting and receiving a radio signal; and a processor connected with the RF unit, wherein the processor is configured to:

cause threshold information to be transmitted to an interfered base station, and receive second feedback information from a first user equipment (UE) selected by the interfered base station, wherein the second feedback information is based on the threshold information and first feedback information, and wherein the second feedback information reflects interference that the interfering base station imposes on the first UE, select a precoding matrix that minimizes interference to the first UE based on the second feedback information, and cause a signal to be transmitted to a second UE to which the interfering base station offers a service by applying the precoding matrix, wherein the first feedback information is obtained by the first UE by measuring a reference signal of the interfering base station and a reference signal of the interfered base station to compare reception power, and wherein the first UE is selected because the first feedback information satisfies a comparison condition with the threshold, among a plurality of UEs to which the interfered base station offers a service.

* * * * *